United States Patent
Jain et al.

(10) Patent No.: US 9,888,078 B2
(45) Date of Patent: *Feb. 6, 2018

(54) REQUESTING STORAGE PERFORMANCE MODELS FOR A CONFIGURATION PATTERN OF STORAGE RESOURCES TO DEPLOY AT A CLIENT COMPUTING ENVIRONMENT

(71) Applicant: International Business Machines Corporation, Armonk, NY (US)

(72) Inventors: Rakesh Jain, San Jose, CA (US); Ramani R. Routray, San Jose, CA (US); Sumant Padbidri, San Jose, CA (US); Yang Song, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,720

(22) Filed: Aug. 11, 2015

(65) Prior Publication Data

US 2016/0219107 A1    Jul. 28, 2016

Related U.S. Application Data

(63) Continuation of application No. 14/603,271, filed on Jan. 22, 2015.

(51) Int. Cl.
*H04L 12/24* (2006.01)
*H04L 29/08* (2006.01)
*G06F 3/06* (2006.01)

(52) U.S. Cl.
CPC ........ *H04L 67/1097* (2013.01); *G06F 3/0611* (2013.01); *G06F 3/0619* (2013.01);
(Continued)

(58) Field of Classification Search
CPC . H04L 41/0803; H04L 67/1097; H04L 67/10; H04L 43/50; H04L 41/0806;
(Continued)

(56) References Cited

U.S. PATENT DOCUMENTS 7,188,335 B1 *  3/2007  Darr .......................... G06F 8/10
                                                                  717/104
7,643,983 B2 *  1/2010  Lumb ................... G06F 13/105
                                                                  703/20

(Continued)

OTHER PUBLICATIONS

Li et al., "Black-box Performance Modeling for Solid State Drives", Aug. 17, 2010, 2010 IEEE International Symposium on Modeling, Analysis & Simulation of Computer and Telecommunications Systems (MASCOTS).*

(Continued)

*Primary Examiner* — Hua Fan
*Assistant Examiner* — Todd L Barker
(74) *Attorney, Agent, or Firm* — David W. Victor; Konrad, Raynes, Davda and Victor LLP

(57) ABSTRACT

Provided are a method, system and program for requesting storage performance models for a configuration pattern of storage resources to deploy at a client computing environment. A determination is made of a new configuration pattern of storage resources to deploy. A request is sent to a service provider with information on the new configuration pattern. A result set is received from the service provider having at least one provided configuration pattern having a degree of similarity to the new configuration pattern and a storage performance model for each of the provided configuration patterns. Each of the storage performance models indicate workload and performance characteristics for one of the provided configuration patterns. One of the provided configuration patterns is selected from the result set and the
(Continued)

storage performance model for the selected configuration pattern is used to model performance at the client.

6 Claims, 9 Drawing Sheets

(52) U.S. Cl.
CPC .......... *G06F 3/0665* (2013.01); *G06F 3/0689* (2013.01); *H04L 41/0806* (2013.01); *H04L 41/0826* (2013.01); *H04L 67/1008* (2013.01); *H04L 41/5019* (2013.01)

(58) Field of Classification Search
CPC ............. H04L 41/0826; H04L 67/1008; H04L 41/5019; G06F 3/0604; G06F 13/105; G06F 3/0611; G06F 3/0619; G06F 3/0689; G06F 3/0665
See application file for complete search history.

(56) References Cited

U.S. PATENT DOCUMENTS

| | | | | |
|---|---|---|---|---|
| 8,140,682 | B2* | 3/2012 | Murthy | G06F 9/5061 709/223 |
| 8,447,851 | B1* | 5/2013 | Anderson | G06F 11/3006 707/600 |
| 8,903,995 | B1* | 12/2014 | Basak | H04L 43/08 709/224 |
| 9,032,399 | B1* | 5/2015 | Yang | G06F 9/45558 718/1 |
| 9,128,739 | B1* | 9/2015 | Juels | G06F 9/45533 |
| 9,170,737 | B1* | 10/2015 | Gugliemino | G06F 3/0629 |
| 9,223,675 | B2 | 12/2015 | Worthington et al. | |
| 2005/0097517 | A1* | 5/2005 | Goin | H04L 41/0803 717/124 |
| 2006/0074970 | A1* | 4/2006 | Narayanan | G06F 11/3419 |
| 2007/0022142 | A1* | 1/2007 | Palmer | G06Q 10/06 |
| 2010/0262633 | A1* | 10/2010 | Bhattacharjee | G06F 17/30312 707/812 |
| 2011/0153507 | A1* | 6/2011 | Murthy | G06F 9/5061 705/304 |
| 2013/0013881 | A1 | 1/2013 | Yamada et al. | |
| 2013/0036286 | A1 | 2/2013 | Jin et al. | |
| 2013/0124669 | A1 | 5/2013 | Anderson et al. | |
| 2013/0138812 | A1 | 5/2013 | Assuncao et al. | |
| 2013/0211809 | A1 | 8/2013 | Maruyama | |
| 2013/0326051 | A1 | 12/2013 | LeGendre et al. | |
| 2014/0047095 | A1 | 2/2014 | Breternitz et al. | |
| 2014/0278808 | A1 | 9/2014 | Lyoob et al. | |
| 2015/0286409 | A1* | 10/2015 | Chandra | G06F 3/0604 711/170 |
| 2016/0134493 | A1 | 5/2016 | Susarla et al. | |
| 2016/0359683 | A1* | 12/2016 | Bartfai-Walcott | H04L 41/22 |

OTHER PUBLICATIONS

Basak et al., "Model Builidng for Dynamic Multi-tenant Provider Environments", Dec. 2012, ACM SIGOPS Operating Systems Review, ACM.*
Joo et al, "Rapid Prototyping and Evaluation of Intelligence Functions of Active Storage Devices", 2014, IEEE Transactions on Computers, vol. 63, No. 9, Sep. 2014.*
Black et al., "Accelerating Data Center Workloads with Solid-State Drives", Jul. 2012, Intel.*
Khan, "A Comparitive Study of White Box, Black Box and Grey Box Testing Techniques", 2012, International Journal of Advanced Computer Science and Applications, vol. 3, No. 6.*
Kim, "Parameter I/O Management forf Solid State Disks (SSDs)", May 2012, vol. 61, No. 5.*
Wikipedia, "Black-Box Testing", (online) retrieved from the Internet on Dec. 7, 2014, at URL>http://en.wikipedia.org/wiki/Black-box_testing . . . , Total 3 pages.
Wikipedia, "Gray-Box Testing", (online) retrieved from the Internet on Dec. 7, 2014, at URL>http://en.wikipedia.org/wiki/Gray_box_testing . . . , Total 4 pages.
Wikipedia, "White-Box Testing", (online) retrieved from the Internet on Dec. 7, 2014, at URL> http://en.wikipedia.org/wiki/White-box_testing . . . , Total 4 pages.
U.S. Appl. No. 14/603,264, filed Jan. 22, 2015, invented by Rakesh Jain et al., Total 39 pages.
U.S. Appl. No. 14/603,274, filed Jan. 22, 2015, invented by Rakesh Jain et al., Total 39 pages.
Preliminary Amendment, dated Aug. 5, 2015, for U.S. Appl. No. 14/603,274, filed Jan. 22, 2015, invented by Rakesh Jain et al., Total 7 pages.
U.S. Appl. No. 14/816,963, filed Aug. 3, 2015, invented by Rakesh Jain et al., Total 37 pages.
U.S. Appl. No. 14/603,271, filed Jan. 22, 2015,, invented by Rakesh Jain et al., Total 39 pages.
U.S. Appl. No. 14/819,020, filed Aug. 5, 2015, invented by Rakesh Jain et al., Total 39 pages.
Preliminary Amendment, dated Aug. 3, 2015, for U.S. Appl. No. 14/603,264, filed Jan. 22, 2015, invented by Rakesh Jain et al., Total 6 pages.
Preliminary Amendment, dated Aug. 3, 2015, for U.S. Appl. No. 14/816,963, filed Aug. 3, 2015, invented by Rakesh Jain et al., Total 6 pages.
Preliminary Amendment, dated Aug. 5, 2015, for U.S. Appl. No. 14/819,020, filed Aug. 5, 2015, invented by Rakesh Jain et al., Total 7 pages.
List of Related Applications, pp. 2, dated Aug. 11, 2015.
Preliminary Amendment, dated Aug. 11, 2015, for U.S. Appl. No. 14/603,271, filed Jan. 22, 2015, invented by Rakesh Jain et al., Total 7 pages
Song et al. "Queing-Based Storage Performance Modeling and Placement in Openstack Environments", dated Dec. 2014, 21st International Conference on High Performance Computing, IEEE publication, Total 10 pages.
Office Action, dated Sep. 8, 2016, for U.S. Appl. No. 14/603,264 (72.53) filed Jan. 22, 2015, invented by Rakesh Jain et al., Total 33 pages.
Response to Office Action, dated Dec. 8, 2016, for U.S. Appl. No. 14/603,264 (72.53) filed Jan. 22, 2015, invented by Rakesh Jain et al., Total 10 pages.
Final Office Action, dated Mar. 9, 2017, for U.S. Appl. No. 14/603,264 (72.53) filed Jan. 22, 2015, invented by Rakesh Jain et al., Total 87 pages.
Response to Final Office Action, dated Jun. 9, 2017, for U.S. Appl. No. 14/603,264 (72.53) filed Jan. 22, 2015, invented by Rakesh Jain et al., Total 16 pages.
Notice of Allowance, dated Jul. 13, 2017, for U.S. Appl. No. 14/603,264 (72.53) filed Jan. 22, 2015, invented by Rakesh Jain et al., Total 11 pages.
Office Action, dated Sep. 8, 2016, for U.S. Appl. No. 14/816,963 (72.53C1), filed Aug. 31, 2015, invented by Rakesh Jain et al., Total 31 pages.
Response to Office Action, dated Dec. 8, 2016, for U.S. Appl. No. 14/816,963 (72.53C1), filed Aug. 3, 2015, invented by Rakesh Jain et al., Total 10 pages.
Final Office Action, dated Mar. 10, 2017, for U.S. Appl. No. 14/816,963 (72.53C1), filed Aug. 31, 2015, invented by Rakesh Jain et al., Total 70 pages.
Response to Final Office Action, dated Jun. 9, 2017, for U.S. Appl. No. 14/816,963 (72.53C1), filed Aug. 3, 2015, invented by Rakesh Jain et al., Total 12 pages.
Notice of Allowance, dated Jul. 18, 2017, for U.S. Appl. No. 14/816,963 (72.53C1), filed Aug. 3, 2015, invented by Rakesh Jain et al., Total 23 pages.
Office Action, dated Sep. 15, 2016, for U.S. Appl. No. 14/603,271 (72.54) filed Jan. 22, 2015, invented by Rakesh Jain et al., Total 35 pages.
Response to Office Action, dated Dec. 15, 2016, for U.S. Appl. No. 14/603,271 (72.54) filed Jan. 22, 2015, invented by Rakesh Jain et al., Total 13 pages.

(56) References Cited

OTHER PUBLICATIONS

Final Office Action, dated Mar. 9, 2017, for U.S. Appl. No. 14/603,271 (72.54) filed Jan. 22, 2015, invented by Rakesh Jain et al., Total 87 pages.
Response to Final Office Action, dated Jun. 9, 2017, for U.S. Appl. No. 14/603,271 (72.54) filed Jan. 22, 2015, invented Rakesh Jain et al., Total 16 pages.
Notice of Allowance, dated Jul. 26, 2017, for U.S. Appl. No. 14/603,271 (72.54) filed Jan. 22, 2015, invented by Rakesh Jain et al., Total 26 pages.
Office Action, dated Oct. 24, 2016, for Serial No. 14603274 (72.55), filed Jan. 22, 2015, invented by Rakesh Jain et al., Total 36 pages.
Response to Final Office Action, dated Jan. 24, 2017, for U.S. Appl. No. 14/603,274 (72.55), filed Jan. 22, 2015, invented by Rakesh Jain et al., Total 13 pages.
Final Office Action, dated Feb. 24, 2017, for U.S. Appl. No. 14/603,274 (72.55), filed Jan. 22, 2015, invented by Rakesh Jain et al., Total 35 pages.
Response to Final Office Action, dated Apr. 24, 2017, for U.S. Appl. No. 14/603,274 (72.55), filed Jan. 22, 2015, invented by Rakesh Jain et al., Total 12 pages.
Office Action, dated Jul. 27, 2017, for U.S. Appl. No. 14/603,274 (72.55), filed Jan. 22, 2015, invented by Rakesh Jain et al., Total 31 pages.
Office Action, dated Nov. 3, 2016, for U.S. Appl. No. 14/819,020 (72.55C1), filed Aug. 5, 2015, invented by Rakesh Jain et al., Total 33 pages.
Response to Office Action, dated Feb. 3, 2017, for U.S. Appl. No. 14/819,020 (72.55C1), filed Aug. 5, 2015, invented by Rakesh Jain et al., Total 10 pages.
Final Office Action, dated Feb. 27, 2017, for U.S. Appl. No. 14/819,020 (72.55C1), filed Aug. 5, 2015, invented by Rakesh Jain et al., Total 20 pages.
Response to Final Office Action, dated Apr. 27, 2017, for U.S. Appl. No. 14/819,020 (72.55C1), filed Aug. 5, 2015, invented by Rakesh Jain et al., Total 10 pages.
Office Action, dated Jul. 26, 2017, for U.S. Appl. No. 14/819,020 (72.55C1), filed Aug. 5, 2015, invented by Rakesh Jain et al., Total 23 pages.
Notice of Allowance, dated Oct. 25, 2017, for U.S. Appl. No. 14/603,264 (72.53) filed Jan. 22, 2015, invented by Rakesh Jain et al., Total 14 pages.
Notice of Allowance, dated Oct. 19, 2017, for U.S. Appl. No. 14/816,963 (72.53C1), filed Aug. 3, 2015, invented by Rakesh Jain et al., Total 14 pages.
Notice of Allowance, dated Sep. 29, 2017, for U.S. Appl. No. 14/603,271 (72.54) filed Jan. 22, 2015, invented by Rakesh Jain et al., Total 14 pages.
Response to Office Action, dated Oct. 26, 2017, for U.S. Appl. No. 14/603,274 (72.55) filed Jan. 22, 2015, invented by Rakesh Jain et al., Total 12 pages.
Response to Office Action, dated Oct. 26, 2017, for U.S. Appl. No. 14/819,020 (72.55C1), filed Aug. 5, 2015, invented by Rakesh Jain et al., Total 9 pages.

* cited by examiner

Published Configuration Pattern

Similar Storage Attribute Sets

REQUESTING STORAGE PERFORMANCE MODELS FOR A CONFIGURATION PATTERN OF STORAGE RESOURCES TO DEPLOY AT A CLIENT COMPUTING ENVIRONMENT

CROSS-REFERENCE TO RELATED APPLICATION

This application is a continuation of U.S. patent application Ser. No. 14/603,271, filed Jan. 22, 2015, which application is incorporated herein by reference in its entirety.

BACKGROUND OF THE INVENTION

1. Field of the Invention

The present invention relates to a computer program product, system, and method for requesting storage performance models for a configuration pattern of storage resources to deploy at a client computing environment.

2. Description of the Related Art

Cloud computing and software defined environments often utilize the Software As Service (SaaS) software distribution model where applications are hosted by a service provider and made available to service consumers over the network. In a typical multi-tenant SaaS architecture, data from multiple companies is stored on a single service provider instance, usually separated by a tenancy partition to prevent the visibility of data from one tenant to another. Standardized logical tenancy partitions are established for the different tenants housed on the same service provider instance. In such a model, service provider application resources (such as repository/database instance(s), application server instance(s)) are multiplexed and used. However, the storage devices used by the tenants are separately managed so that the tenants have separate storage resources to store their data, which may be confidential and cannot be shared.

SUMMARY

Provided are a method, system and program for requesting storage performance models for a configuration pattern of storage resources to deploy at a client computing environment. A determination is made of a new configuration pattern of storage resources to deploy in the client configuration environment. A request is sent to a service provider with information on the new configuration pattern. A result set is received from the service provider having information on at least one provided configuration pattern having a degree of similarity to the new configuration pattern and a storage performance model for each of the provided configuration patterns. Each of the storage performance models indicate workload and performance characteristics for one of the provided configuration patterns. One of the provided configuration patterns is selected from the result set and the storage performance model for the selected configuration pattern is used to model performance at the client computing environment of the new configuration pattern of storage resources.

DETAILED DESCRIPTION

Described embodiments provide techniques for allowing client systems or computing environments to publish information on their storage configuration patterns of storage resources and a storage performance model providing a model of the performance of the storage configuration pattern with a central service provider. The central service provider may then make the published storage configurations and storage performance models available to other client systems to access when they deploy similar storage configuration patterns. The clients may want to obtain a storage performance model for a similar published storage configuration pattern to use to determine how to deploy storage resources. This allows clients to share storage performance models from other clients in the system, which may be sharing a same software service. By sharing the published configuration patterns, a client does not have to construct the storage performance model for a newly deployed storage configuration pattern for which the client does not have information.

Figure 1:
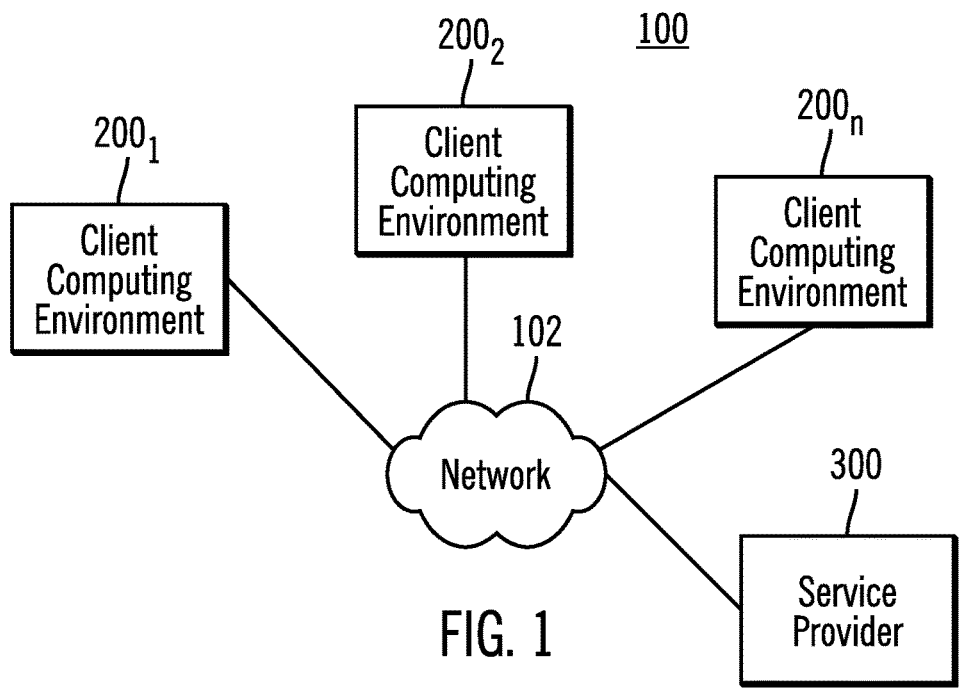
FIG. 1 illustrates an embodiment of a client computing environment.

FIG. 1 illustrates an embodiment of a network service provider environment 100, such as a cloud computing environment, having one or more client computing environments $200_1, 200_2 \ldots 200_n$ and a central service provider 300 that communicate over a network 102. Each client computing environment $200_1, 200_2 \ldots 200_n$ has storage resources configured for use with a software service managed by the service provider 300. In one embodiment, the service provider 300 may provide a software as a service (SaaS) architecture to the clients $200_1, 200_2 \ldots 200_n$, which may comprise tenants that receive the software service from the service provider 300. For instance, in a multi-tenant architecture, the service provider 300 provides every tenant/client a dedicated share of the instance including its data, configuration, user management, tenant individual functionality and non-functional properties. In an alternative embodiment, the service provider 300 may implement a multi-instance architecture where separate software service instances operate on behalf of the different tenants $200_1, 200_2 \ldots 200_n$. Although each client $200_1, 200_2 \ldots 200_n$ may receive the software services from the service provider 300, each client $200_1$, $200_2 \ldots 200_n$ maintains separate storage resources for use in the environment 100.

The network 102 may comprise a Storage Area Network (SAN), Local Area Network (LAN), Intranet, the Internet, Wide Area Network (WAN), peer-to-peer network, wireless network, arbitrated loop network, etc.

Figure 2:
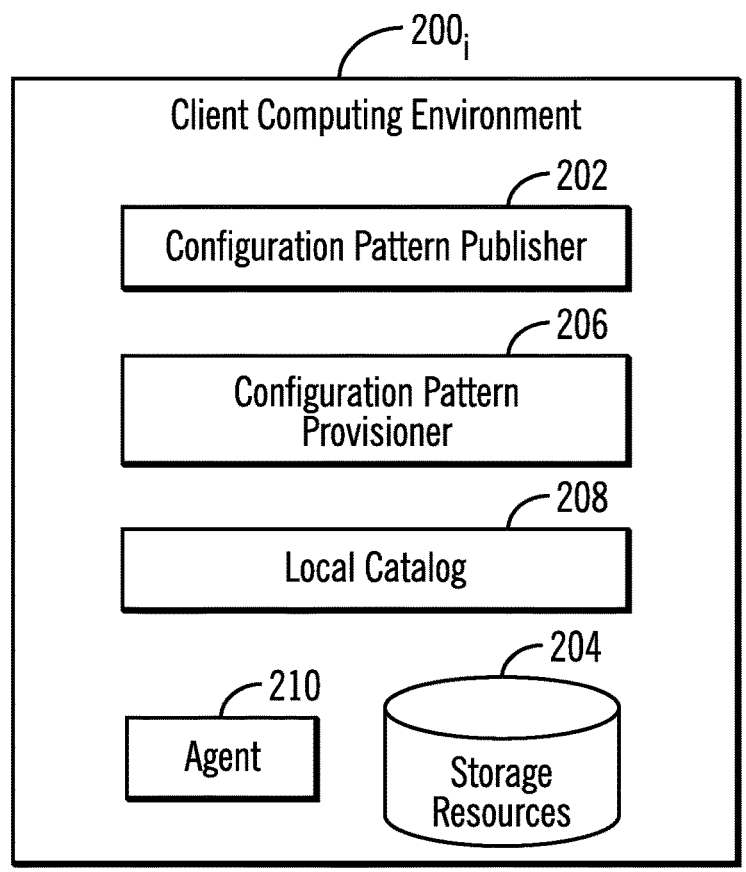
FIG. 2 illustrates an embodiment of components of a client computing environment.

FIG. 2 illustrates an embodiment of an instance of the client computing environment, such as the clients $200_1$, $200_2 \ldots 200_n$, which includes a configuration pattern publisher 202 to publish information on a configuration pattern of storage resources 204 dedicated to the client $200_i$ at the service provider 300. The storage configuration pattern of deployed storage resources 204 may indicate an enclosure type, disk types, encryption settings, compression settings, storage configuration, Redundant Array of Independent Disk (RAID) configuration, etc. The client $200_i$ may further include a configuration pattern provisioner 206 that provisions and deploys storage resources 204 at the client $200_i$; a local catalog 208 having information on storage configuration patterns and storage performance models for those patterns provided by other clients $200_1, 200_2 \ldots 200_n$; and an agent 210 to interact with the service provider 300 to obtain software services and perform storage management operations.

The storage resources 204 may be comprised of one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices included in the storage resources 204 may comprise hard disk drives, solid state drives (SSD) comprised of solid state electronics, flash memory, flash disk, Random Access Memory (RAM) drive, EEPROM (Electrically Erasable Programmable Read-Only Memory), Phase Change Memory, Resistive Memory, storage-class memory (SCM), etc., magnetic storage disk, optical disk, tape, etc.

Figure 3:
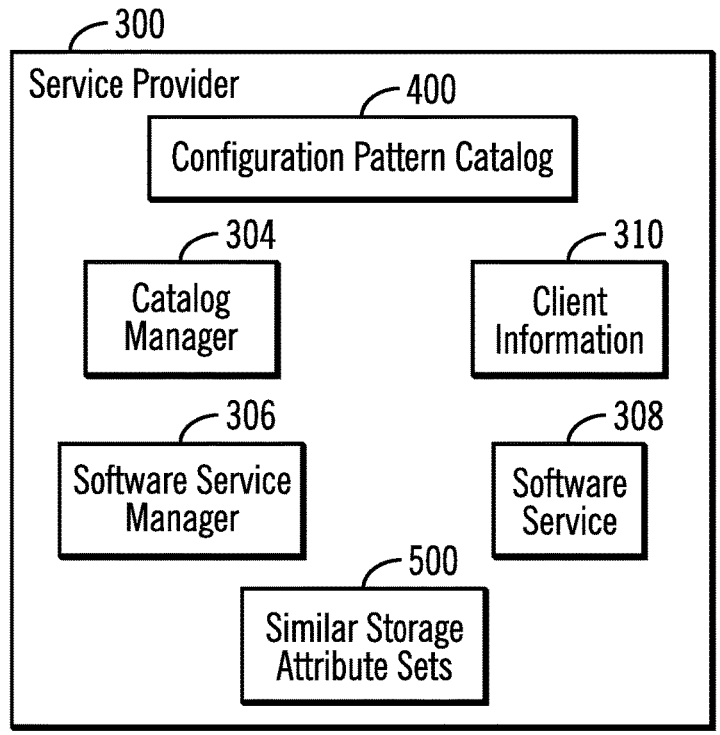
FIG. 3 illustrates an embodiment of components of a service provider.

FIG. 3 illustrates an embodiment of the components of the service provider 300 as including a configuration pattern catalog 400 having the published configuration patterns from the clients $200_1, 200_2 \ldots 200_n$; a catalog manager 304 to perform catalog 400 management operations, such as updating the catalog 400 and responding to client $200_1$, $200_2 \ldots 200_n$ requests with respect to the catalog 304; a software service manager 306 to provide the software service 308 to the clients $200_1, 200_2 \ldots 200_n$, such as a SaaS type software service model; similar storage attribute sets 500 which indicate storage attribute values for storage attribute types that are considered similar for the purpose of determining similar configuration patterns in the configuration pattern catalog 400; and client information 310 having information on the clients $200_1, 200_2 \ldots 200_n$ subscribing to the software service 308, which includes privileges the clients $200_1, 200_2 \ldots 200_n$ have to access published configuration patterns in the catalog 400 and storage performance models to which the clients $200_1, 200_2 \ldots 200_n$ subscribe.

Figure 4:
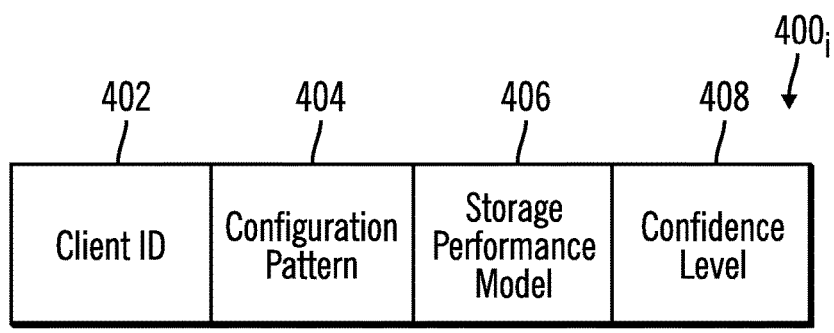
FIG. 4 illustrates an embodiment of a published configuration pattern.

FIG. 4 illustrates an embodiment of a published configuration pattern $400_i$ instance in the catalog 400, and includes a client identifier 402 identifying the client $200_1, 200_2 \ldots 200_n$ that published the pattern $400_i$; the actual configuration pattern comprising detailed information on storage attributes values for storage attribute types of the storage resource 204 deployed at the client 402, including, but not limited to, an enclosure type, disk types, encryption settings, compression settings, storage configuration, Redundant Array of Independent Disk (RAID) configuration, JBOD configuration, etc.; a storage performance model 406 comprising a model of storage performance, such as derived from determined storage performance metrics and expresses the storage performance metrics as a function of a variable. Examples of storage performance models include an Input/Output (I/O) performance latency curve, estimated I/O peak, Input/Output, I/O response time as a function of additional I/O traffic, storage utilization, and other models that model response time and storage performance with respect to different loads, used to determine how storage responds to different loads.

The published configuration pattern $400_i$ further includes a confidence level 408 indicating a degree of confidence in the storage performance model 406. The confidence level 408 may indicate a degree of detail of an internal structure of the storage resources 204 considered in determining the storage metrics. In one embodiment, the confidence level may be based on whether black box, white box, or grey box testing were used to determine the storage performance model 406, where white box has the highest confidence level, grey box the next highest confidence level, and black box the lowest confidence level.

A storage performance model 406 determined according to white box testing involves a determination of storage metrics that tests the internal structures and working of the storage resources 204, which requires knowledge of the specific disk drives, their configuration, RAID array or Just a Bunch of Disk (JBOD) configuration, encryption, enclosures, etc. A storage performance model 406 determined according to black box testing does not consider the internal structures and arrangement of the storage resources 204, but considers the operation and results of the storage resources 204 as a whole, such as from a high level system view. A storage performance model 406 determined according to grey box testing is a combination of the white box and black box testing, which considers certain of the internal structures, but not as many as white box testing, such as the type of underlying storage devices, etc., but more of the internal structures than considered under black box testing.

Figure 5:
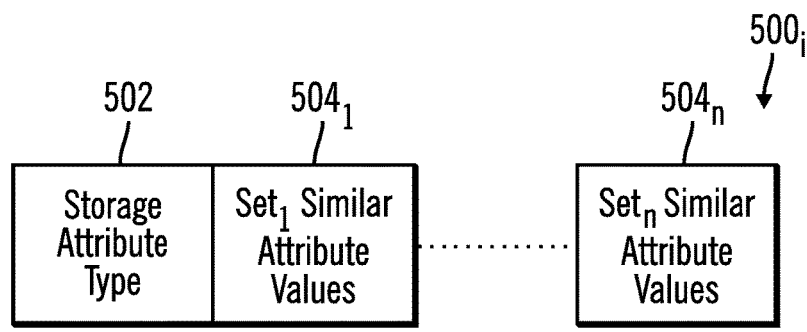
FIG. 5 illustrates an embodiment of similar storage attribute sets for s storage attribute type.

FIG. 5 illustrates an embodiment of an instance $500_i$ of similar storage attribute sets for a storage attribute type, and includes a storage attribute type 502 for which the sets are provided, and one or more sets $504_1 \ldots 504_n$ of similar storage attribute values for the storage attribute type 502, such that each set indicates storage attribute values that are considered similar, such as different values for disk types or numbers, RAID array configuration. Similarity may be based on storage performance, such that different storage configurations and attribute values are considered similar if they produce a similar storage performance model.

Figure 6:
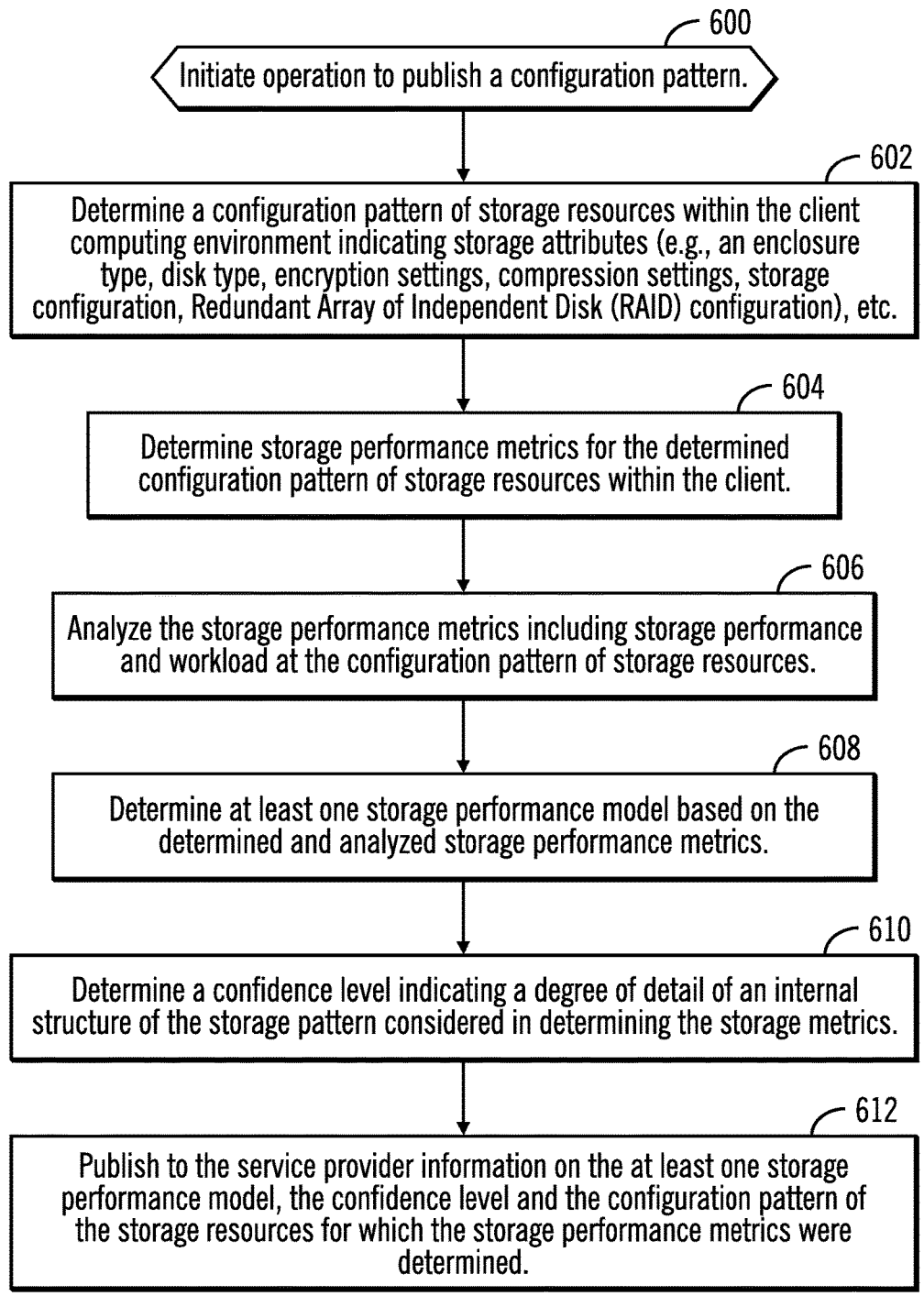
FIG. 6 illustrates an embodiment of operations for a client computing environment to publish a configuration pattern.

FIG. 6 illustrates an embodiment of operations performed by the configuration pattern publisher 202 in a client $200_i$ to publish a configuration pattern of the storage resources 204 being deployed at the client $200_i$. Upon initiating the publishing operation (at block 600), the configuration pattern publisher 202 determines (at block 602) a configuration pattern of storage resources within the client computing environment indicating storage attribute values for storage attribute types s (e.g., an enclosure type, disk type, encryption settings, compression settings, storage configuration, Redundant Array of Independent Disk (RAID) configuration) settings, Just a Bunch of Disk (JBOD) settings, etc. The configuration pattern publisher 202 determines (at block 604) storage performance metrics for the determined configuration pattern of storage resources 204 within the client $200_i$. The storage performance metrics may be determined by examining the published performance capabilities of the storage resources 204, such as disks, RAID controller, etc. In further embodiments, the storage performance metrics may be determined by the client $200_i$ monitoring actual Input/Output (I/O) response time at the storage resources 204 and the sub-components of the storage resources 204 if a more detailed level of the internal structures is considered, such as the case with white and grey box testing models.

The configuration pattern publisher 202 analyzes (at block 606) the storage performance metrics including storage performance and workload at the configuration pattern of the storage resources 204 and determines (at block 608) at least one storage performance model based on the determined and analyzed storage performance metrics. The storage performance model may comprise a function modeling a response of the storage resources to workload, such as an Input/Output (I/O) performance latency curve, estimated I/O peak, Input/Output, I/O response time as a function of additional I/O traffic, storage utilization, etc. The publisher 202 may determine one or more different performance models to publish. The configuration pattern publisher 202 may further determine (at block 610) a confidence level indicating a degree of detail of an internal structure of the storage pattern considered in determining the storage metrics, such as whether the performance metrics were considered using a white box, grey box or black box level of detail of the considered storage performance metrics. The publisher 202 provides, i.e., publishes, (at block 612) to the service provider 300 the published configuration pattern $400_i$ having the at least one storage performance model 406, the confidence level 408 and the configuration pattern 404 of the storage resources 204 for which the storage performance metrics were determined.

Figure 7:
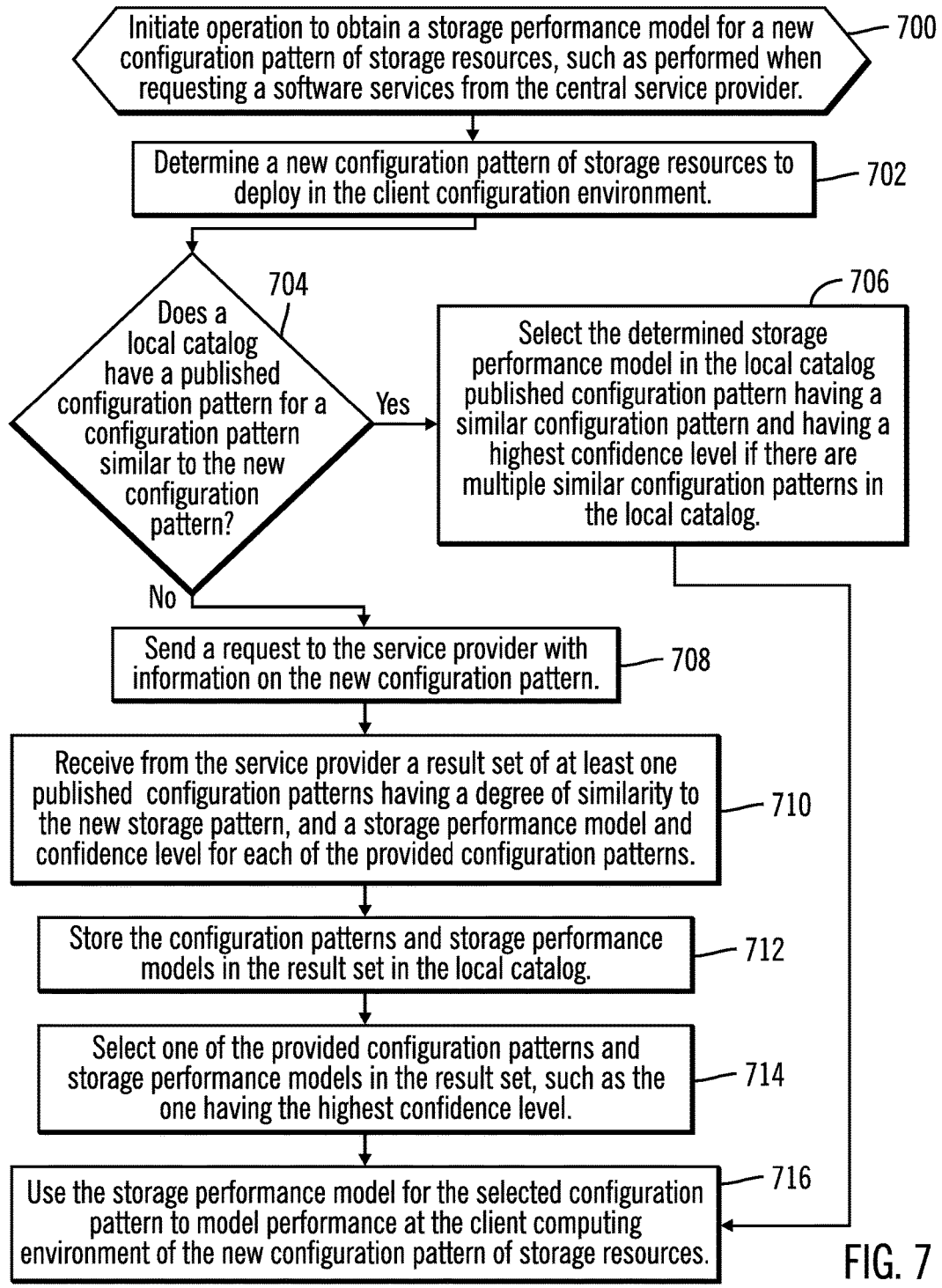
FIG. 7 illustrates an embodiment of operations by a client computing environment to request published configuration patterns for a new configuration pattern of storage resources at the client.

FIG. 7 illustrates an embodiment of operations performed by the configuration pattern provisioner 206 to obtain a published configuration pattern $400_i$ from the service provider 300 to use to provision new storage resources in the client $200_i$. Upon initiating (at block 700) operations to obtain the storage performance model, the provisioner 206 determines (at block 702) a new configuration pattern of storage resources 204 to deploy at the client $200_i$. If (at block 704) the local catalog 208 has a published configuration pattern $400_i$ for a configuration pattern 404 similar to that of the new configuration pattern, then the provisioner 206 selects (at block 706) the determined storage performance model 406 in the local catalog 208 of the published configuration pattern $400i$ having a similar configuration pattern 404 and having a highest confidence level 408 if there are multiple similar configuration patterns in the local catalog 208. The provisioner 206 may determine a similar configuration from the published configuration patterns $400_i$ in the local catalog 208 that have storage attribute values for storage attribute types that are identical or indicated in the same set of similar attribute values $504_1 \ldots 504_n$ for the storage attribute type 502.

If (at block 704) the local catalog 208 does not have a published configuration pattern $400_i$ with a similar storage pattern, then the provisioner 206 sends (at block 708) a request to the service provider 300 with information on the new configuration pattern. The provisioner 206 may then receive (at block 710) from the service provider 300 a result set of at least one published configuration pattern $400_i$ having a degree of similarity to the new storage pattern, and a storage performance model 406 and confidence level 408 for each of the provided configuration patterns. The provisioner 206 may store (at block 712) the received published configuration patterns $400_i$ in the local catalog 208.

The provisioner 206 selects (at block 714) one of the provided published configuration patterns and storage performance models in the result set, such as the one having the highest confidence level. The provisioner 206 may then use (at block 716) the storage performance model for the selected configuration pattern to model performance at the client computing environment of the new configuration pattern of storage resources. For instance, the provisioner 206 may use the selected storage performance model to determine the best storage placement in the new provisioned storage resources 204 for a new software service 308 to which the client $200_i$ is subscribing from the service provider 300.

Figure 8:
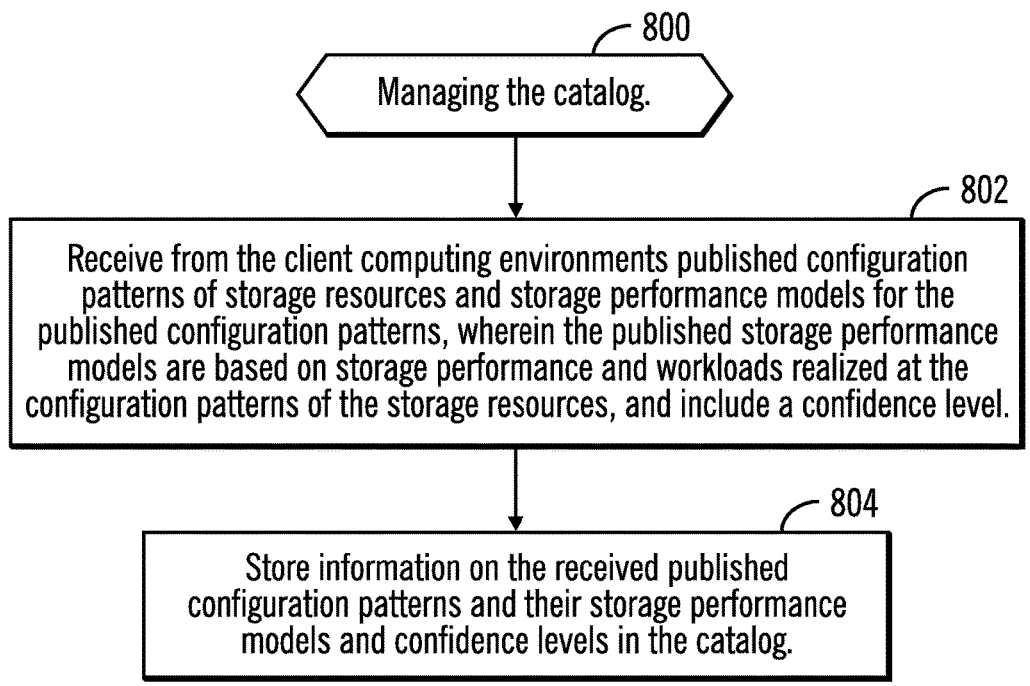
FIG. 8 illustrates an embodiment of operations by a service provider to manage a catalog of published configuration patterns.

FIG. 8 illustrates an embodiment of operations performed by the catalog manager 304 of the service provider 300 to manage the catalog 400. When managing (at block 800) the catalog 400, the catalog manager 304 may receive (at block 802) from the client computing environments $200_1$, $200_2 \ldots 200_n$ published configuration patterns $400_i$ of storage resources 204 and storage performance models 406 for the published configuration patterns $400_i$. The received published storage performance models may be based on storage performance and workloads realized at the configuration patterns of the storage resources, and include a confidence level 408. The catalog manager 304 stores (at block 804) information on the received published configuration patterns $400i$ and their storage performance models 406 and confidence levels 408 in the catalog 400.

Figure 9:
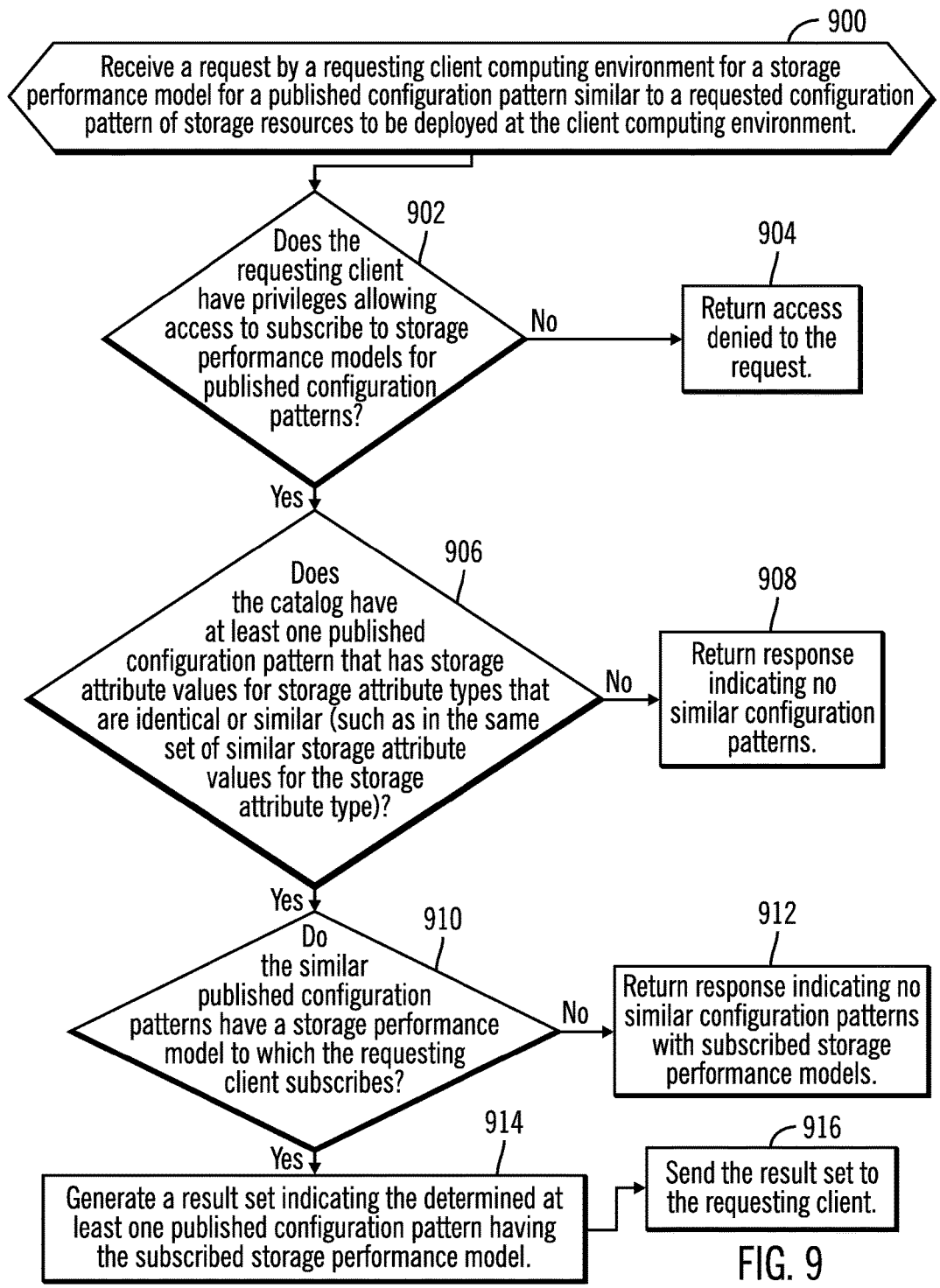
FIG. 9 illustrates an embodiment of operations to process a request from a client computing environment for published configuration patterns similar to a requested configuration pattern.

FIG. 9 illustrates an embodiment of operations performed by the catalog manager 304 to process a request for a published configuration pattern that is similar to a requested new configuration pattern of storage resources 204 to be deployed and provisioned at the requesting client $200_i$. Upon receiving (at block 900) a request from a requesting client computing environment $200_i$ for a storage performance model for a requested configuration pattern of storage resources 204 to be deployed at the client computing environment $200_i$, the catalog manager 500 determines (at block 902) whether the requesting client $200_i$ has privileges indicated in the client information 310 allowing access to subscribe to storage performance models for published configuration patterns in the catalog 400. If (at block 902) the requesting client $200_i$ does not have privileges to access published configuration patterns, then the catalog manager 500 returns (at block 904) a response that access is denied for the request to the requesting client $200_i$. If (at block 902) the requesting client $200_i$ does have sufficient privileges, then the catalog manager 304 determines (at block 906) whether the catalog 400 has at least one published configuration pattern $400_i$ that has storage attribute values for storage attribute types that are identical or similar to the requested new configuration pattern for the requesting client $200_i$. A published configuration pattern 404 may be deemed similar if it has storage attribute values that are in the same set of similar storage attribute values $504_1 \ldots 504_n$ for the storage attribute values of the requested configuration pattern for storage attribute types.

If (at block 906) the catalog 400 does not have at least on published configuration pattern $400_i$ that matches or is similar to the requested configuration pattern, then the catalog manager 304 returns (at block 908) a response to the requesting client $200_i$ indicating that there are no similar published configuration patterns for the new storage resources 204 being deployed at the requesting client $200_i$. If (at block 906) the catalog 400 has at least on published configuration pattern $400_i$ that matches or is similar to the requested configuration pattern, then the catalog manager 304 determines (at block 910) whether the similar published configuration patterns $400_i$ have a storage performance 406 model to which the requesting client $200_i$ subscribes as indicated in the client information 310. If (at block 910) there are no determined published configuration patterns having a storage performance model 406 to which the requesting client $200_i$ subscribes, then the catalog manager 304 returns (at block 912) a response indicating there is no similar published configuration patterns with subscribed storage performance models. Otherwise, if (at block 910) there are similar published configuration patterns $400_i$ having storage performance models 406 to which the client $200_i$ subscribes, then the catalog manager 304 generates (at block 914) a result set indicating the determined at least one published configuration pattern having the subscribed storage performance model 406. The result set is then sent (at block 916) to the requesting client $200_i$ to use as described with respect to FIG. 7.

In embodiments where the client computing environments comprise tenants in a multi-tenancy environment that share a software service provided by a central service provider, described techniques are provided for abstracting, sharing, and managing black box storage information across tenant in a Software as Service (SaaS) environment. Due to the heterogeneity of storage devices in Software-Defined Environment and Software-Defined Storage, white box models may not be attainable since a storage resource may consist of multiple customized configurations of commodity storage devices. Therefore, black box performance models are usually used in such environments which rely on observation of the Input/Output and response time, among other performance characteristics, such as IO density. However, if a tenant does not have prior knowledge of a new storage device, black box modeling techniques cannot be applied.

In described SaaS environments, the central service provider has a global view of all tenants. In such case, the central service provider 300 specifies the taxonomy and syntax of the characteristics of storage devices in all tenants, e.g., clients $200_i$, and an agent on each tenant, e.g., configuration pattern publisher 202, will publish the required knowledge of storage devices within that tenant so that each tenant can subscribe to the specific model that is needed from the service provider. The storage performance models to which tenants may subscribe may include a response time change curve along with IO changes. When the central service provider receives a request for a storage performance model from a subscriber (i.e., a tenant), the central service provider will search the available knowledge (e.g., black box models) from all publishers (i.e., registered tenants) for the matched model. If an exact match is found, the service provider can return this model knowledge to the subscriber, e.g., "Another tenant has the same type of storage device X with same configurations, its IO-latency curve is captured by function F, and its estimated peak IO is P, . . . " Therefore, this tenant can obtain the knowledge from other tenants via the service provider. Each tenant can be a subscriber or a publisher, or both.

Cloud Computing Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
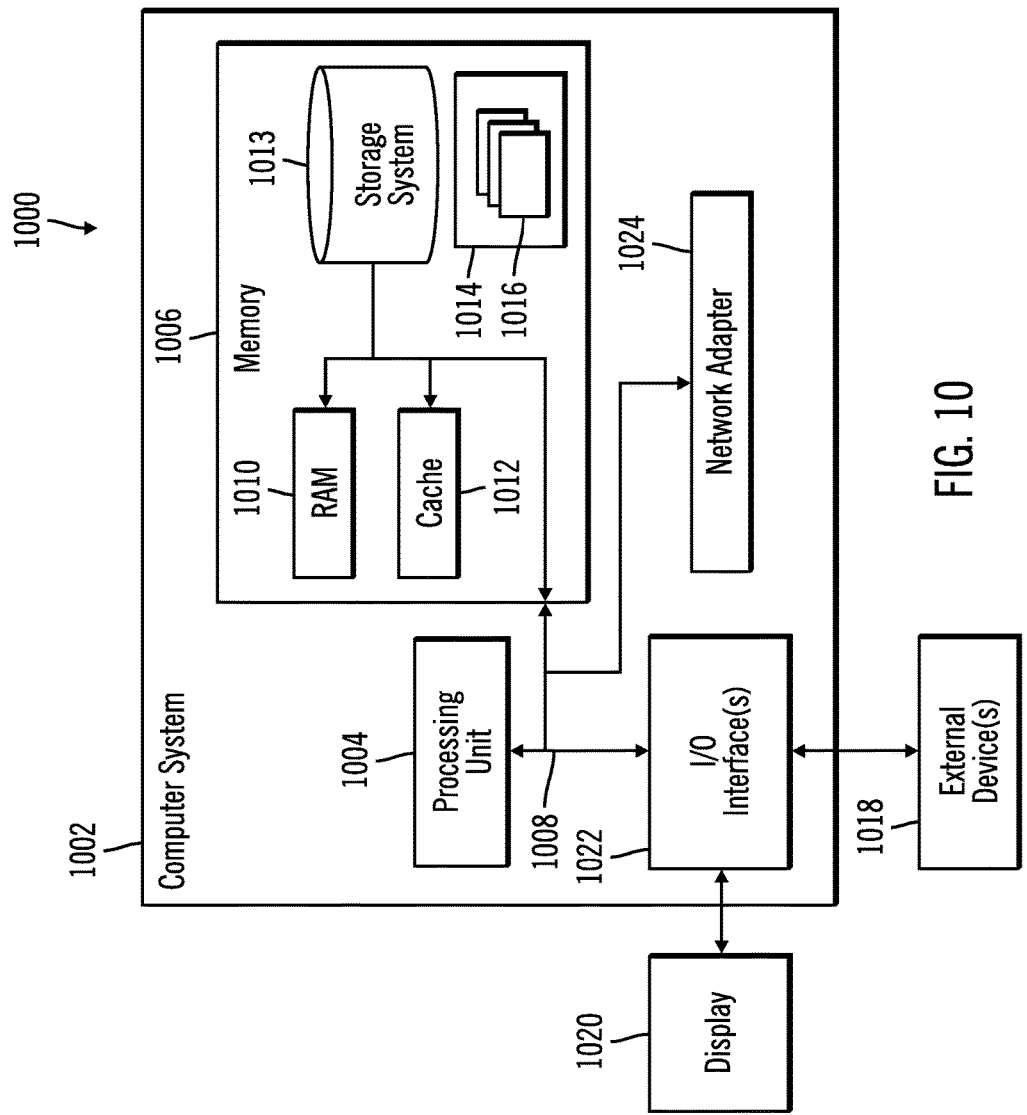
FIG. 10 depicts an embodiment of a cloud computing node.

Referring now to FIG. 10, a schematic of an example of a cloud computing node is shown, such as the nodes $200_1$, $200_2 \ldots 200_n$ and 300. Cloud computing node 1000 is only one example of a suitable cloud computing node and is not intended to suggest any limitation as to the scope of use or functionality of embodiments of the invention described herein. Regardless, cloud computing node 1000 is capable of being implemented and/or performing any of the functionality set forth hereinabove.

In cloud computing node 1000 there is a computer system/server 1002, which is operational with numerous other general purpose or special purpose computing system environments or configurations. Examples of well-known computing systems, environments, and/or configurations that may be suitable for use with computer system/server 1002 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1002 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1002 in cloud computing node 1000 is shown in the form of a general-purpose computing device. The components of computer system/server 1002 may include, but are not limited to, one or more processors or processing units 1004, a system memory 1006, and a bus 1008 that couples various system components including system memory 1006 to processor 1004.

Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1016 generally carry out the functions and/or methodologies of embodiments of the invention as described herein.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 20. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

Figure 11:
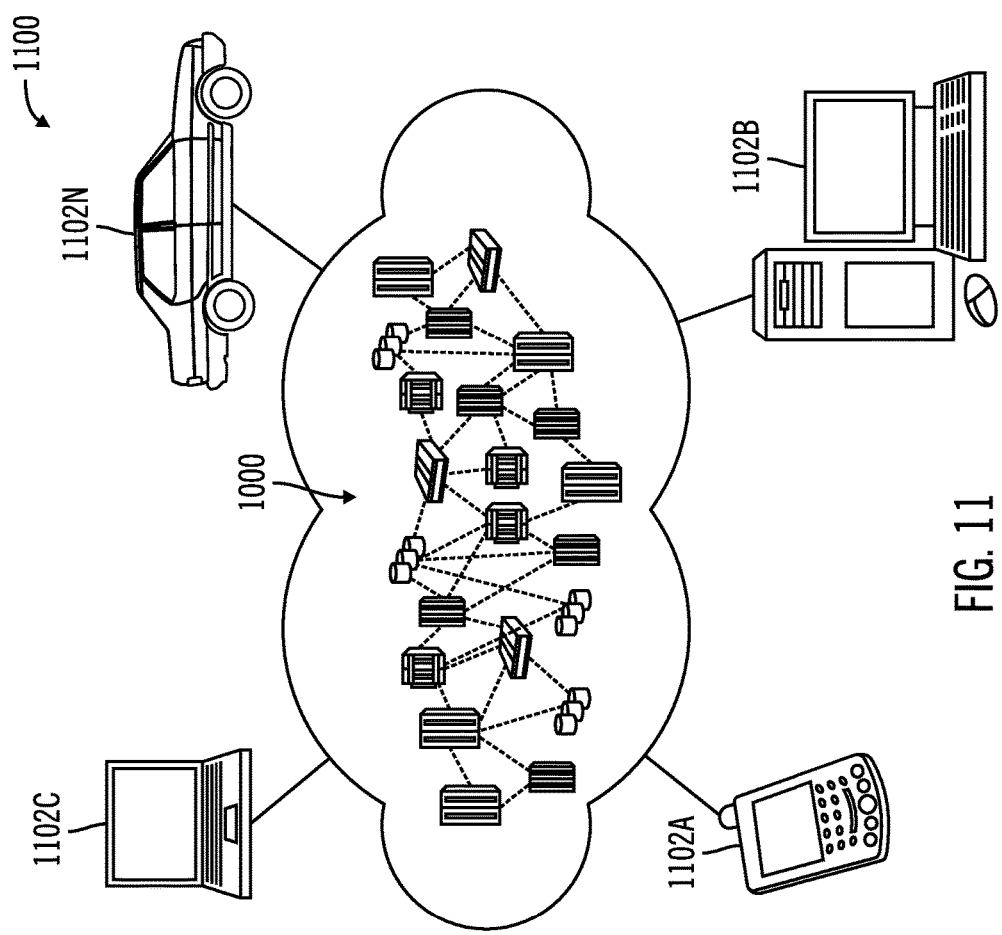
FIG. 11 depicts an embodiment of a cloud computing environment.

Referring now to FIG. 11, illustrative cloud computing environment 1100 is depicted. As shown, cloud computing environment 1100 comprises one or more cloud computing nodes 1000 with which local computing devices used by cloud consumers, such as, for example, personal digital assistant (PDA) or cellular telephone 1102A, desktop computer 1102B, laptop computer 1102C, and/or automobile computer system 1102N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 110 to offer infrastructure, platforms and/or software as services for which a cloud consumer does not need to maintain resources on a local computing device. It is understood that the types of computing devices 1102A-N shown in FIG. 11 are intended to be illustrative only and that computing nodes 1000 and cloud computing environment 1100 can communicate with any type of computerized device over any type of network and/or network addressable connection (e.g., using a web browser).

Figure 12:
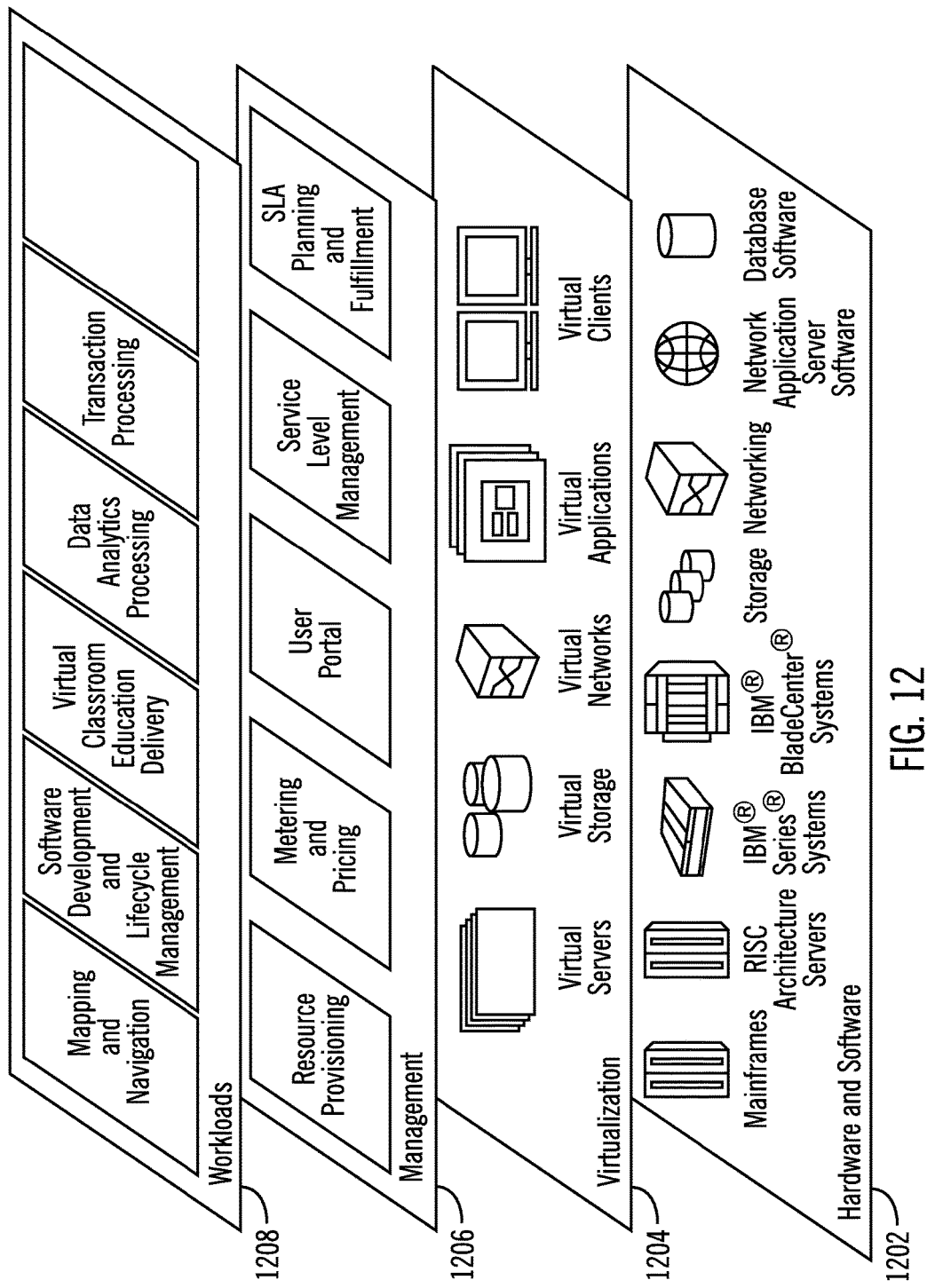
FIG. 12 depicts an embodiment of abstraction model layers of a cloud computing environment.

Referring now to FIG. 12, a set of functional abstraction layers provided by cloud computing environment 1100 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1202 includes hardware and software components. Examples of hardware components include: mainframes; RISC (Reduced Instruction Set Computer) architecture based servers; storage devices; networks and networking components. In some embodiments, software components include network application server software.

Virtualization layer 1204 provides an abstraction layer from which the following examples of virtual entities may be provided: virtual servers; virtual storage; virtual networks, including virtual private networks; virtual applications and operating systems; and virtual clients.

In one example, management layer 1206 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1208 provides examples of functionality for which the cloud computing environment may be utilized. Examples of workloads and functions which may be provided from this layer include: mapping and navigation; software development and lifecycle management; virtual classroom education delivery; data analytics processing; transaction processing; and components of the computing environment 100, including configuration pattern publisher 202, configuration pattern provisioner 206, the catalog manager 304, software service manager 306, and the software service 308.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as i and n, used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method performed by a processor executing program code in a non-transitory computer readable storage medium for deploying storage resources at a client computing environment, comprising:

determining a new configuration pattern of storage resources to deploy in the client computing environment;

determining if a local catalog includes one or more published configuration patterns similar to the new configuration pattern;

selecting a published configuration pattern in the local catalog having a similar configuration pattern to the new configuration pattern and highest confidence level if there are multiple published configuration patterns in the local catalog having similar configuration patterns;

sending a request to a service provider with information of the new configuration pattern if there is no published configuration pattern in the local catalog having a similar configuration pattern;

receiving, from the service provider, a result set having at least one provided configuration pattern data structure having a degree of similarity to the new configuration pattern, wherein each of the at least one provided configuration pattern data structure includes a configuration pattern of storage resources including attributes values for storage attributes of the storage resources deployed at the client, a storage performance model for the configuration pattern of storage resources, and a confidence level indicating a degree of detail of an internal structure of the configuration pattern of storage resources considered in determining storage performance metrics, wherein the storage performance model indicates workload and performance characteristics for the configuration pattern of storage resources based on the storage performance metrics as a function of different workloads at the configuration pattern of storage resources that models how the configuration pattern of storage resources responds to different workloads, wherein the storage performance model is determined according to the storage performance metrics that test internal structures and workings of the configuration pattern of storage resources and operations and results of the configuration pattern of storage resources;

selecting a configuration pattern data structure from one of the at least one provided configuration pattern data structure from the result set in response to receiving the result set; and using the storage performance model for the selected configuration pattern data structure from the result set or the selected published configuration pattern from the local catalog to model performance at the client computing environment of the new configuration pattern of storage resources.

2. The method of claim 1, further comprising:

requesting a new software service from the service provider, wherein the determining the new configuration pattern comprises determining the new configuration pattern to support the requested new software service, wherein the using the storage performance model comprises applying the storage performance model to determine provisioning of the new configuration pattern of storage resources to be used for the requested new software service.

3. The method of claim 1, further comprising:

subscribing, by the client computing environment, to a type of storage performance model, wherein the the at least one provided configuration pattern data structure of the received result set has the storage performance model of the subscribed type of storage performance model.

4. The method of claim 1, wherein the storage performance model for each provided configuration pattern comprises at least one of an Input/Output (I/O) performance latency curve, estimated I/O peak, Input/Output, I/O response time as a function of additional I/O traffic, and storage utilization.

5. The method of claim 1, wherein the information on the new configuration pattern sent to the service provider includes attributes of the storage resources including at least one of an enclosure type, disk type, encryption settings, compression settings, storage configuration, a Redundant Array of Independent Disk (RAID) configuration, and a Just a Bunch of Disk (JBOD) configuration.

6. The method of claim 1, wherein the selected configuration pattern data structure from the result set has a highest confidence level for the at least one provided configuration pattern data structure from the result set.

* * * * *